United States Patent [19]
Canfield

[11] 4,369,611
[45] Jan. 25, 1983

[54] TOP HEAT SEALING UNIT FOR POUCHES
[75] Inventor: Allen B. Canfield, Sarasota, Fla.
[73] Assignee: Rexham Corporation, New York, N.Y.
[21] Appl. No.: 166,072
[22] Filed: Jul. 7, 1980
[51] Int. Cl.³ .................... B65B 51/14; B65B 55/04
[52] U.S. Cl. ................................ 53/127; 53/373; 53/DIG. 2; 493/209
[58] Field of Search ........... 53/373, 379, 388, DIG. 2, 53/127, 440; 493/209, 207, 206; 156/583.91, 583.9, 583.1

[56] References Cited
U.S. PATENT DOCUMENTS

| 2,649,674 | 8/1953 | Bartelt | 53/373 X |
| 3,673,041 | 6/1972 | Schulz et al. | 156/306 |
| 3,679,509 | 7/1972 | Fielibert | 53/373 X |
| 3,830,681 | 8/1974 | Wilson | 53/373 X |
| 3,982,991 | 9/1976 | Hamm et al. | 53/373 X |
| 4,081,942 | 4/1978 | Johnson | 53/22 B |

FOREIGN PATENT DOCUMENTS 1235047 7/1969 United Kingdom .
1273245 11/1969 United Kingdom .
1300788 12/1970 United Kingdom .
1484078 5/1975 United Kingdom .

Primary Examiner—James F. Coan
Attorney, Agent, or Firm—Leydig, Voit, Osann, Mayer & Holt, Ltd.

[57] ABSTRACT

The top of a flexible pouch is sealed when two heated bars are pressed into engagement with opposite sides of the pouch. One of the bars is formed with two angled surfaces which converge into intersecting relation with one another so as to drive moisture from the seal area and enable the formation of a substantially blemish-free seal.

8 Claims, 4 Drawing Figures

U.S. Patent   Jan. 25, 1983   4,369,611
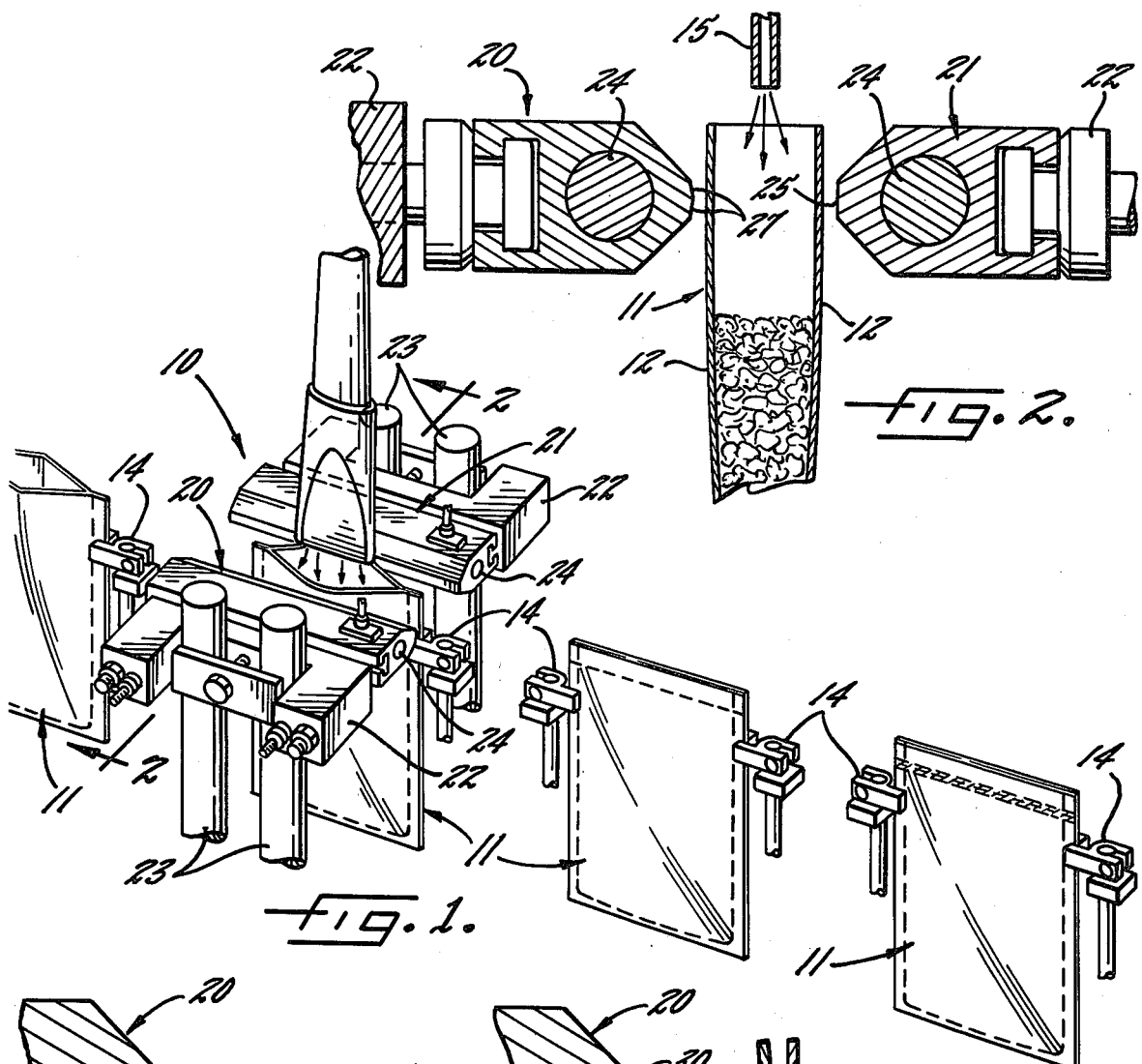
fig. 2.
fig. 1.
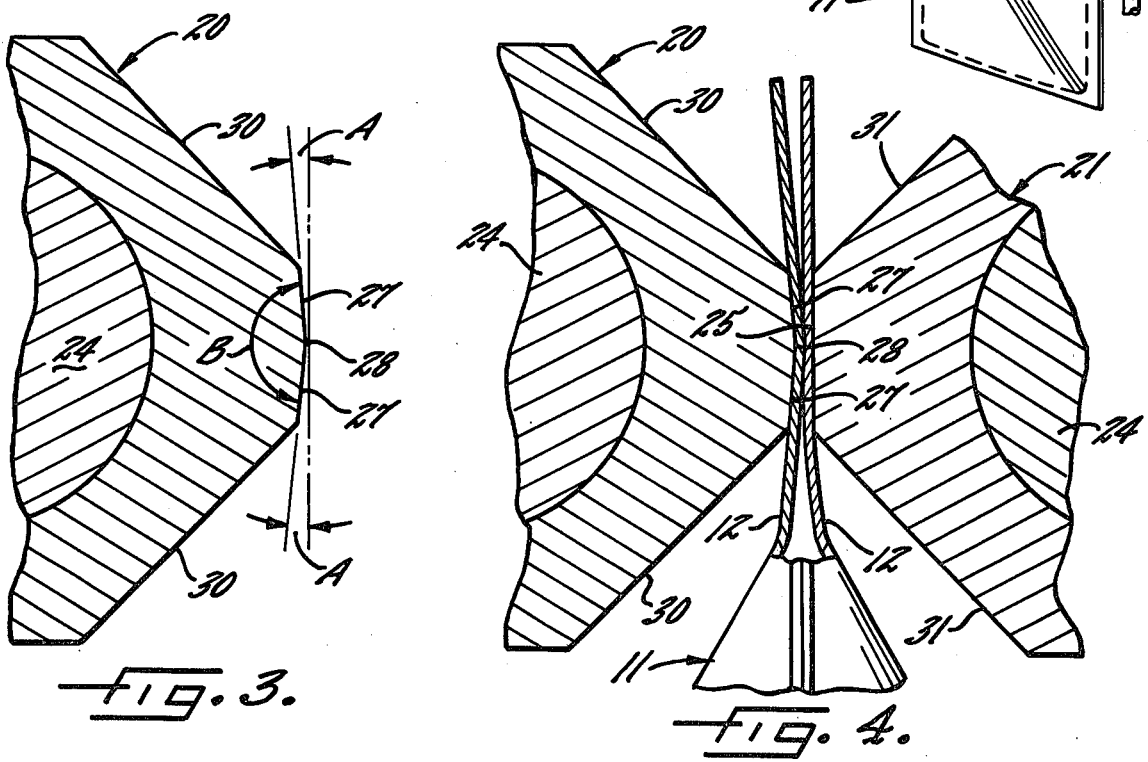
fig. 3.
fig. 4.

TOP HEAT SEALING UNIT FOR POUCHES

BACKGROUND OF THE INVENTION

This invention relates to a unit adapted to be used with an automatic packaging machine for heat sealing the tops of upright pouches which have been filled with product by the machine. Such a unit usually comprises a pair of elongated and generally horizontal sealing bars disposed on opposite sides of the pouch and adapted to be momentarily moved into engagement with the top portion of the pouch. Both bars usually are heated and thus the sealing is effected by the heat and pressure applied by the bars.

The invention more particularly relates to a unit for sealing pouches which either have been filled with a liquid food product and/or which are purged with steam after having been filled. A packaging machine in which the pouches are filled with food product and then are purged with steam is disclosed in Johnson U.S. Pat. No. 4,081,942.

Some difficulty is encountered in sealing pouches which have been filled with liquid food product and/or purged with steam. When droplets or particles of food product and/or droplets of condensate are present in the seal area of the pouch, blisters and blemishes may be formed in the seal when heat is applied to the pouch by the sealing bars. The problems presented by contamination of the seal areas are discussed in detail in Schultz et al U.S. Pat. No. 3,673,041 and Wilson U.S. Pat. No. 3,830,681.

SUMMARY OF THE INVENTION

The general aim of the present invention is to provide a heat sealing unit having a new and improved sealing bar which is of relatively simple and inexpensive construction and which is uniquely shaped so as to drive moisture out of the seal area and to prevent such moisture from being trapped in the seal area during formation of the seal, the seal bar also being capable of sealing through any small product particles which might be present in the seal area.

A more detailed object is to achieve the foregoing by providing a sealing unit in which one sealing bar is formed with a sealing face having novel angled surfaces which converge into intersecting relation with one another. A narrow line-type seal is formed by the intersection of the angled surfaces and, during the sealing operation, the angled surfaces heat the areas immediately above and below the seal to drive out moisture and enable the formation of a virtually blemish-free seal.

These and other objects and advantages of the invention will become more apparent from the following detailed description when taken in conjunction with the accompanying drawings.

BRIEF DESCRIPTION OF THE DRAWINGS

FIG. 1 is a perspective view which schematically shows an automatic packaging machine equipped with a new and improved heat sealing unit incorporating the unique features of the present invention.

FIG. 2 is an enlarged fragmentary cross-section taken substantially along the line 2—2 of FIG. 1 and shows the pouch just prior to the time the pouch is closed and sealed.

FIG. 3 is an enlarged fragmentary view of one of the sealing bars shown in FIG. 2.

FIG. 4 is a fragmentary cross-section showing the sealing bars forming the seal.

DETAILED DESCRIPTION OF THE PREFERRED EMBODIMENT

As shown in the drawings for purposes of illustration, the invention is embodied in a heat sealing unit 10 which forms part of an automatic packaging machine and which seals the tops of envelope-type pouches 11 after the pouches have been filled by the machine. Each pouch includes two flexible panels 12 which are sealed or otherwise joined together along their side and bottom margins, the upper end of the pouch being open until the pouch is filled and sealed.

A typical packaging machine with which the sealing unit 10 may be used is disclosed in the aforementioned Johnson patent. Briefly, each pouch 11 is held by clamps 14 and is advanced intermittently along a predetermined path to a filling station where a liquid food product such as gravy or sauce is deposited into the pouch. The pouch then dwells in a second filling station where another product (e.g., chunks of meat or vegetables) is deposited into the pouch.

After each pouch 11 has been filled, it is advanced to and dwells in a steaming and sealing station. At that station, steam is introduced into the pouch through a nozzle 15 in order to drive air and gases out of the pouch. While the steam is being introduced into the pouch, the top of the pouch is stretched closed and then is sealed in order to trap the steam in the headspace of the pouch and to prevent air from entering the pouch.

To seal the pouch 11, the sealing unit 10 comprises a pair of elongated and generally horizontal sealing bars 20 and 21 disposed on opposite sides of the pouch and adapted to be swung into and out of engagement with the upper end portion of the pouch when the latter dwells in the sealing station. Herein, each sealing bar is made of metal (e.g., stainless steel) and is attached to a mounting bracket 22. Each mounting bracket, in turn, is carried on the upper end portions of a pair of upright rods 23 which are adapted to be swung toward and away from the pouch.

Electrical heating elements 24 (FIG. 2) are embedded in the sealing bars 20 and 21 and are operable to heat the bars. Each time a pouch 11 dwells in the sealing station, the two pairs of rods 23 are swung toward one another to press the heated bars into engagement with the upper end portion of the pouch. The heat and pressure applied by the bars seals the two side panels 12 together adjacent the top of the pouch.

The sealing bar 21 is formed with a flat and planar sealing face 25 which is disposed in a vertical plane and which serves as an anvil for the sealing bar 20. In accordance with the present invention, the sealing bar 20 is formed with a uniquely shaped angled sealing face which effectively drives out moisture from between the upper end portions of the panels 12 of the pouch 11 so that a substantially blemish-free seal can be formed.

More specifically, the sealing face of the sealing bar 20 is formed by upper and lower inclined surfaces 27 (FIGS. 3 and 4) which converge into intersecting relation with one another as the surfaces progress forwardly toward the pouch 11. Each of the surfaces 27 is flat and planar and is inclined relative to the vertical at an angle A (FIG. 3) which may range between 5 and 10 degrees, the two angles A herein being equal. Thus, the included angle B of convergence between the two surfaces 27 ranges between 160 and 170 degrees. The line 28 of intersection between the two surfaces is slightly rounded (e.g., on a radius of 0.005") rather than being perfectly sharp.

Located rearwardly of the inclined surfaces 27 are two additional upper and lower inclined surfaces 30 (FIG. 3) which also are flat and planar and which also converge toward one another upon progressing forwardly. The angle of convergence between the surfaces 30 is considerably less than the angle B and is approximately 90 degrees. Both of the surfaces 30 are inclined at the same angle and their forward margins are spaced vertically from one another and are co-extensive with the rear margins of the surfaces 27. The inclined surfaces 30 provide clearance between the seal bar 20 and those portions of the pouch located above and below the seal area. Inclined surfaces 31 (FIG. 4) similar to the surfaces 30 are formed on the seal bar 21 above and below the sealing face 25.

When the bars 20 and 21 are closed, a line-type hermetic seal approximately ⅛ of an inch in width is formed in the vicinity of the intersection 28 of the angled faces 27. Above and below the seal, the angled faces heat the pouch and drive out any moisture which might be present. The heat applied by the angled surfaces 27 above and below the ⅛" seal does not actually seal the side panels but instead simply renders the panels tacky and leaves the panels open so that the vaporized moisture may escape from between the panels. The moisture does not, therefore, form bubbles and blisters in the seal area.

After the pouch 11 has been sealed by the bars 20 and 21, an impression seal is formed over the seal made by the bars 20 and 21. The impression seal is made by a pair of bars (not shown) located downstream from the bars 20 and 21 and having a complementary rib and groove which form a distinct and visible seal along the pouch. Thereafter, the extreme top of the pouch is sealed by a pair of downstream cosmetic sealing bars (not shown) in order to prevent contamination from entering between the extreme top edges of the side panels.

I claim:

1. A packaging machine having means for advancing upright pouches along an upright path, each of said pouches having an open upper end portion and being defined by two opposing upright side panels made of heat sealable material, each of said pouches receiving a product at a filling station positioned along said path, means downstream of said filling station for introducing steam into each filled pouch to drive air out of the pouch, a heat sealing unit for sealing the upper end portion of each pouch after steam has been introduced therein, said heat sealing unit comprising first and second elongated and generally horizontal opposing rigid bars adapted to close and apply heat and pressure upon the upper end portion of each pouch below the upper edge thereof, and means for heating at least one of said bars, said packaging machine being characterized in that said one bar has an active forward side defined by a set of upper and lower generally planar and inclined faces which converge into intersecting relation with one another upon progressing forwardly, the included angle of convergence between said faces being obtuse with the surface defined along the intersection of said faces forming the forwardmost extremity of said one bar and defining a sealing surface, said sealing surface engaging the upper end portion of one of said side panels when said rigid bars are closed to apply heat and pressure so as to form a narrow, single line-type seal along the upper end portion of the pouch only at the intersection of said rigid bar faces, said inclined faces being positioned closely adjacent said one side panel when the latter is engaged by said sealing surface with the heat emanating from said inclined faces serving to drive moisture created by the steam upwardly and downwardly off of the inner sides of said panels in the area of said seal so as to leave said seal area substantially moisture-free.

2. A packaging machine as defined in claim 1 in which said included angle of convergence is in the range of between 160 and 170 degrees.

3. A heat sealing unit as defined in claim 2 in which said upper and lower faces are both inclined at the same angle.

4. A packaging machine as defined in claim 1 in which the active forward side of said one bar further includes a second set of upper and lower generally planar and inclined faces which converge toward one another upon progressing forwardly, the forward margins of said second inclined faces being spaced vertically from one another with said second inclined faces extending rearwardly from the rear margins of said first upper and lower inclined faces, respectively, the included angle of convergence between said second set of surfaces being less than the angle of convergence between said first set of surfaces.

5. A heat sealing unit as defined in claim 4 in which the angle of convergence between said first set of inclined faces is in the range of between 160 and 170 degrees.

6. A heat sealing unit as defined in claim 5 in which the angle of convergence between said second set of inclined faces is approximately 90 degrees.

7. A heat sealing unit as defined in any of claims 4, 5 or 6 in which the upper and lower faces of said first set are both inclined at the same angle.

8. A packaging machine having means for advancing upright pouches along an upright path, each of said pouches having an open upper end portion and being defined by two opposing upright side panels made of heat sealable material, means along said path for introducing a substance into each of said pouches, a heat sealing unit for sealing the upper end portion of each pouch after said substance has been introduced therein, said heat sealing unit comprising first and second elongated and generally horizontal opposing rigid bars adapted to close and apply heat and pressure upon the upper end portion of each pouch below the upper edge thereof, and means for heating at least one of said bars, said packaging machine being characterized in that said one bar has an active forward side defined by a set of upper and lower generally planar and inclined faces which converge into intersecting relation with one another upon progressing forwardly, the included angle of convergence between said faces being obtuse with the surface defined along the intersection of said faces forming the forwardmost extremity of said one bar and defining a sealing surface, said sealing surface engaging the upper end portion of one of said side panels when said rigid bars are closed to apply heat and pressure so as to form a narrow single line-type seal along the upper end portion of the pouch only at the intersection of said rigid bar faces, said inclined faces being positioned closely adjacent said one side panel when the latter is engaged by said sealing surface with the heat emanating from said inclined faces serving to drive residue of said substance upwardly and downwardly off of the inner sides of said panels in the area of said seal so as to leave said seal area substantially free of said residue.

* * * * *